United States Patent [19]

Herb et al.

[11] Patent Number: 4,462,147
[45] Date of Patent: Jul. 31, 1984

[54] METHOD FOR SIMULTANEOUS MACHINING OF A STACK OF PLATE-LIKE WORKPIECES

[75] Inventors: Eugen Herb, Ditzengen; Berthold Leibinger, Gerlingen, both of Fed. Rep. of Germany

[73] Assignee: Trumpf America, Inc., Farmington, Conn.

[21] Appl. No.: 176,902

[22] Filed: Aug. 11, 1980

Related U.S. Application Data

[62] Division of Ser. No. 944,165, Sep. 20, 1978, Pat. No. 4,270,253.

[51] Int. Cl.³ .............................................. B23P 11/00
[52] U.S. Cl. ....................................... 29/423; 29/558; 409/132
[58] Field of Search ................. 29/26 A, 33 K, 33 P, 29/423, 445, 522 A, 558; 409/107, 131, 132

[56] References Cited

U.S. PATENT DOCUMENTS 2,548,669  10/1951  Hafer et al. ......................... 409/107
3,130,489  4/1964  Schlage ................................ 29/522

*Primary Examiner*—Z. R. Bilinsky

[57] ABSTRACT

There is disclosed a method and apparatus for the simultaneous machining of a stack of plate-like workpieces wherein the individual workpieces of the stack are initially assembled into a stack which is held in a manner which will not interfere with the subsequent machining operations by use of rivets or the like. The plate-like workpieces are mounted in the stack upon a support plate, and the machining operations are preferably so conducted as to penetrate through the lower most member of the stack and into the upper portion of the support plate. The machine tool is preferably one in which a series of stations for drilling, riveting, machining and then drilling out the rivets is provided. The tool may include means for automatically and precisely moving the stack between the several work stations.

The method involves the preliminary assembly of the stack of plate-like workpieces upon the support plate and the initial clamping in that assembly until the elements of the stack are initially drilled and riveted to secure the elements of the stack in position relative to each other for the subsequent machining operations.

6 Claims, 11 Drawing Figures

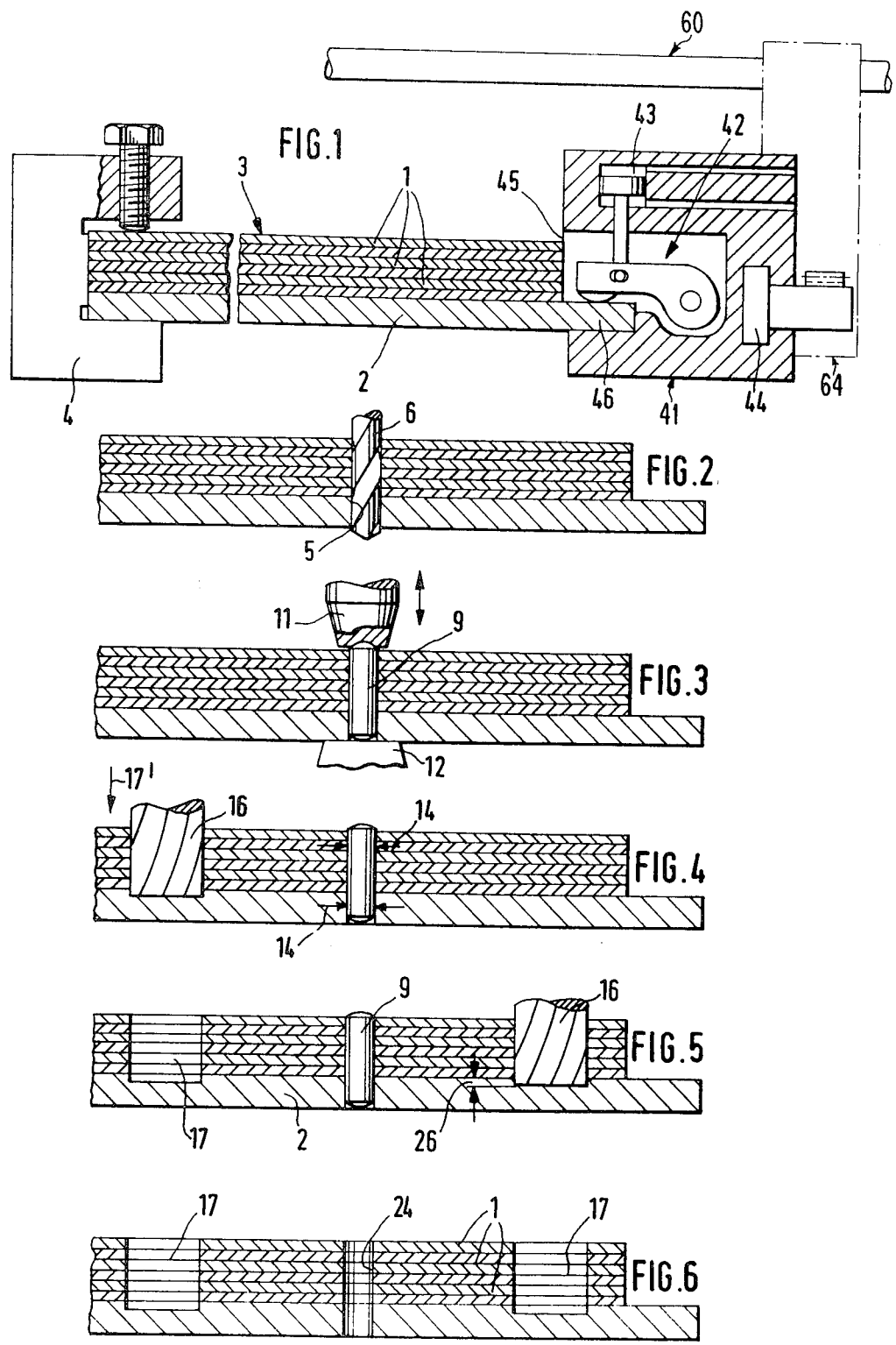

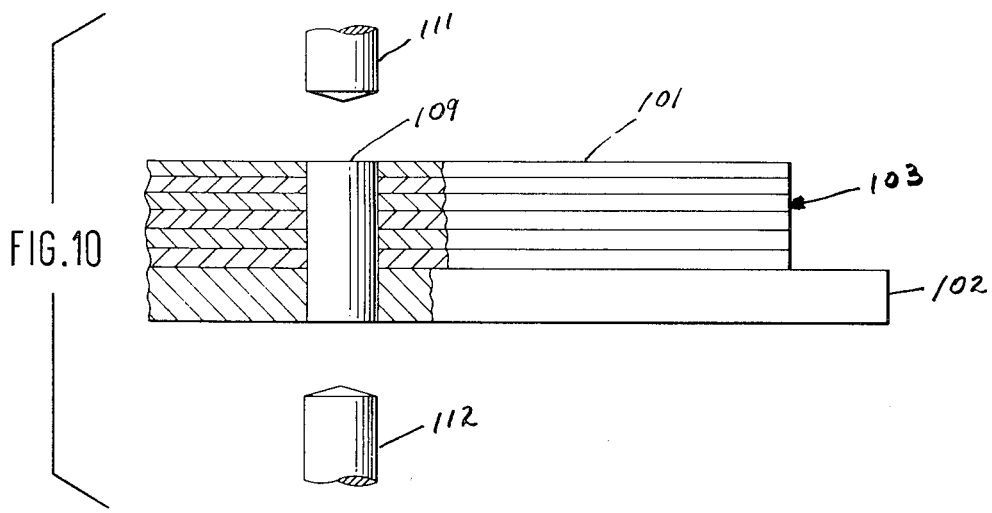
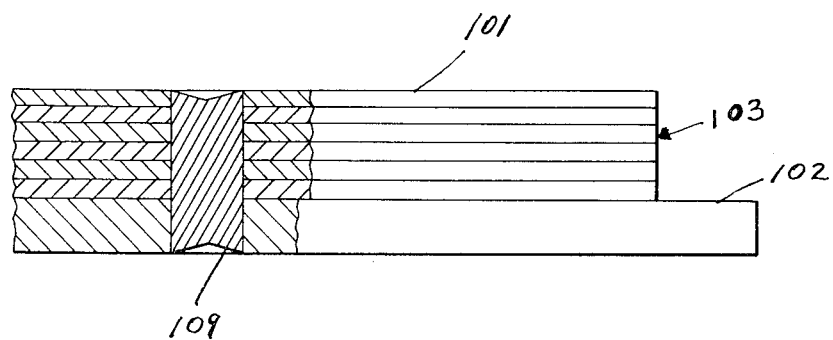
FIG. 10
FIG. 11

METHOD FOR SIMULTANEOUS MACHINING OF A STACK OF PLATE-LIKE WORKPIECES

CROSS REFERENCE TO RELATED APPLICATION

The present application is a division of copending Application Ser. No. 944,165 filed Sept. 20, 1978, now U.S. Letters Pat. No. 4,270,253.

BACKGROUND OF THE INVENTION

Platelike workpieces are machined individually in many different ways, such as, for example, in drilling, punching and milling operations. The time required for the various steps besides the actual machining can be substantial; the steps include clamping and unclamping the workpieces on a support, moving into alignment with the tool, checking dimensions, etc. Consequently, the machining of individual small parts can involve substantial amounts of time and resultant substantial expense.

According, it has long been proposed to assemble a plurality of plate-like workpieces of the same size into a stack which could be simultaneously machined. Generally, the workpieces must be assembled in some form of a jig and then clamped together. However, this arrangement of the workpieces in a stack encounters limitations in that the clamping means will frequently interfere with the machining operations, such as, for example, when the machining operation is being performed by an end milling cutter, in which instance the clamping means might come into contact with the milling tool. As a result, it is necessary to move the clamping means a number of times during the machining operation so that the time advantage theoretically gained by assembling the plate-like pieces into a stack in substantially lost. Moreover, the clamping and unclamping operation can produce substantial problems in reorienting the several pieces of the stack in the exact alignment since otherwise innaccuracies in the multiple machining operation will occur.

It is an object of the present invention to provide a novel method for the simultaneous machining of a stack of plate-like workpieces wherein the workpieces are firmly maintained in initial assembly throughout the machining operations.

It is also an object to provide such a method in which the workpieces may be accurately positioned throughout the several operations without obstruction by clamping means and wherein the elements of the stack may be simultaneously or concurrently machined rapidly and accurately.

Another object is to provide such a method in which movement of the stack of workpieces is effected between the several machining operations of the tool so as to permit facile and rapid performance of a multiplicity of operations upon the workpieces.

A further object is to provide a method for accurately and rapidly machining a plurality of plate-like workpieces while assembled in a stack in which the individual workpieces maintain their alignment throughout the machining operations.

SUMMARY OF THE INVENTION

It has now been found that the foregoing and related objects may be readily attained in a machine tool for the simultaneous machining of a stack of plate-like workpieces, which includes a frame, a table within the frame and having a work-supporting surface, and means for detachably securing a stack of workpieces on the work-supporting surface of the table. Drilling means is supported in the frame for movement substantially perpendicularly to the work-supporting surface for drilling an aperture in a workpiece stack aligned therewith. Riveting means is supported in the frame for movement substantially perpendicularly to the work-supporting surface to insert a rivet into the drilled aperture and deform it into engagement with the surfaces of the workpieces of the stack defining the aperture therethrough to maintain the stack in assembly. Machining means is supported in the frame for movement substantially perpendicularly to the work-supporting surface to machine the stack of workpieces simultaneously.

In the preferred embodiment, the stack securing means is movable within the frame substantially perpendicularly to the axis of movement of the drilling, riveting and machining means in a first direction and in at least a second direction along an axis which is angularly disposed relative to the axis of the first direction. Precision means is provided for moving and positioning the stack securing means relative to the drilling, riveting and machining means so as to precisely locate the stack with respect thereto.

Most usually, the machine tool includes second drilling means supported in the frame for movement substantially perpendicularly to the work-supporting surface for drilling out the rivet from the stack following movement of the stack from alignment with the machining means.

Generally, the riveting means includes a punch, a mandrel cooperating therewith, means for moving the punch and mandrel from an open position towards each other and towards opposite surfaces of the workpiece stack, a magazine for storing rivets, a feed for transporting rivets from the magazine to a discharge position at a point between the punch and mandrel in the open position for insertion of the rivets into the drilled apertures in the workpiece stack. Desirably, the mandrel and the punch have opposing, substantially conical work surfaces for deformation of the rivets.

Preferably, the stack securing means includes at least a pair of releasable clamping members adapted to releasably engage the workpiece stack and a rail extending parallel to the work-supporting surface of the table. These clamping members are movable along its axis to position the stack relative to the several drilling, riveting and machining means. The machine tool will usually include temporary stack securing means for securing the workpiece stack in assembly prior to riveting thereof. Desirably the table is inclined relative to the horizontal.

In its preferred form, the machine tool includes second drilling means as hereinbefore described. The first mentioned drilling means, riveting means, machining means and the second drilling means are disposed seriatim within the frame along a first axis of the table.

In the use of the apparatus and the practice of the method, a stack of platelike workpieces is assembled, and means is applied to temporarily secure the workpieces in the stack. At least two spaced apertures are drilled through the workpieces of the stack, and rivets are inserted into the drilled apertures. These rivets are deformed within the apertures to secure the workpieces in fixed relationship within the stack, and the temporary securing means may be removed. Following riveting assembly, the workpieces of the stack are simultaneously machined. After machining has been completed, the rivets of the stack are drilled out and the workpieces of the stack are disassembled. Preferably the workpieces are assembled in a stack upon a carrier member, and this carrier member is included in the drilling and riveting steps to secure the workpieces in a stack including the carrier member. The machining tool penetrates the workpiece adjacent the carrier member and into the surface of the carrier member. Most desirably, the carrier member and the workpieces are of similar composition.

Generally, the workpiece stack is releasably secured by a securing means and is moved between drilling, riveting and machining means to perform the drilling, riveting and machining steps. Thereafter, the stack is released from the means. The carrier member is of larger dimension than the workpieces so as to provide at least one portion projecting therebeyond, and this projecting portion is releasably secured to the support means.

To facilitate the operations, during the riveting step the rivet does not project beyond the upper surface of the stack and the ends of the rivet are deformed by cooperating punch and mandrel members having substantially conical opposing surfaces.

BRIEF DESCRIPTION OF THE DRAWINGS

FIG. 1 is a fragmentary diagrammatic illustration of a stack of plate-like workpieces assembled on a support plate and temporarily held together by a clamping member, and further showing the end portion of the support plate clamped within movable clamping means of a machine tool produced in accordance with the present invention with the support carriage and main rail diagrammatically illustrated;

FIG. 2 is a similar partially diagrammatic view showing a drill bit penetrating through the workpieces and the support plate;

FIG. 3 is a view similar to FIG. 2 showing the riveting mechanism of the present invention inserting a rivet into the assembled stack of workpieces and support plate;

FIG. 4 is a similar view showing a machining tool machining the workpieces of the stack and penetrating into the upper surface of the support plate;

FIG. 5 is a similar view showing the machined aperture formed by the tool and showing the stack displaced relative to the machining tool so that the machining tool is now machining a second area of the stack;

FIG. 6 is a view similar to FIG. 5 after the machining tool has been removed and after the rivet has also been removed;

FIG. 10 is a partially diagrammatic view of the riveting operation showing fragmentarily the end portions of the preferred form of punch and mandrel and the undeformed rivet within the stack of plate-like members and support plate; and FIG. 11 shows the stack subsequent to deformation of the rivet to secure the elements of the stack in firm alignment.

DETAILED DESCRIPTION OF THE ILLUSTRATED EMBODIMENT

Figure 7:
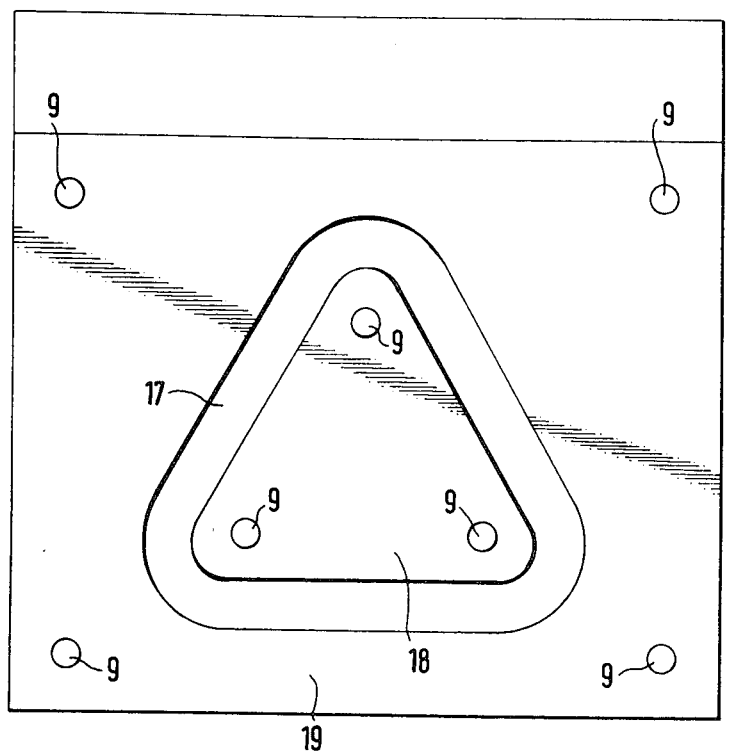
FIG. 7 is a plan view of the stack of workpieces as assembled upon the support plate and showing the locations of the rivet holes and showing a machining operation which has been performed to cut a substantially triangular passage through the assembled stack.

Turning first in detail to FIG. 1 of the attached drawings, the workpieces 1, with the exception of the lowermost workpiece 2, are all of the same dimension and comprise thin rectangular metal sheets. They lie flush upon one another. As seen, the workpiece 2 is the same length as the workpiece 1, but is wider than it so that a clamping edge portion 46 is provided. The workpiece 2 is a workpiece carrier or base plate for the remaining workpieces. If so desired, the base plate 2 may also project beyond the workpieces 1 on the other sides; the stack does not necessarily have to have a rectangular outside contour. The stack 3 of workpieces is secured by means of a clamping device generally designated by the numeral 41 and which preferably has two controllable claws 42. The actuating mechanism 43 for these claws is shown diagrammatically in FIG. 1 as a piston/cylinder arrangement operated by hydraulic fluid supplied through the feed passages. The clamping devices 41 are slidably supported on the cross rail 44 carried by the carriages generally designated by the numeral 64 which in turn may be displaced along a longitudinal rail 60 of the frame 62 of on the machine tool 15. The closed face of the clamping mechanism 41 remote from the cross rail 44 (or the claws 42) forms a stop face 45 for the workpieces 1 in the stack 3.

After alignment in the stack, the workpieces 1 and 2 are pressed together by means of the clamping or holding device 4, which in FIG. 1 is shown merely diagrammatically and which preferably is controlled by numerical control means. It may consist of individual claws or have at least two laterally spaced claws arranged with a space therebetween.

As seen in FIG. 2, when the workpieces of the stack 3 are pressed together immovably by means of the holding device 4, the stack 3 is drilled through at least two spaced predetermined points. The holes 5 pass through the whole of the stack including the base plate 2. The drill 6 is shown in the drill chuck of a feedable drilling spindle 7. The direction of feed downwardly and upwardly is shown schematically in FIG. 8 by the double arrow 8. These drilled holes are located either where there is to be a waste piece and/or at those points at which the final workpieces are to exhibit drilled holes. Preferably in the latter case, a drill bit 6 is employed having a smaller diameter than ultimately intended, and these predrilled holes are drilled out to the desired diameter at a suitable time.

As now seen in FIG. 3, into the drilled holes 5 rivets 9 are next introduced. These rivets 9 are deformed by means of the riveting mechanism 10 which includes a riveting punch 11 and a support 12 acting as a mandrel. When the workpieces 1 and 2 are riveted together in this way into a stack of workpieces, the holding device 4 may be opened and if necessary removed.

As shown in FIG. 4, the rivets are so deformed and set that they do not project beyond at least the lower surface of the stack, and the parts of the stack are held together by radial compression as is symbolized by the arrow 14.

Since the stack 3 is now clamped in the clamping device of the machine tool 15 rigidly, it is ready for simultaneous and similar machining. This machine tool has a longitudinal feed and cross feed and, in accordance with the invention, it is shown as a milling machine 15 with end milling cutters 16. With the latter, not only internal but also external contours may be produced or machined.

As seen in FIG. 4, the milling cutter 16 is fed downwardly in the direction of the arrow 17 far enough for it to pass completely through all the workpieces 1 but only partially into the base plate 2. If, with the milling cutter 16, a groove 17 closed on itself is machined as seen in FIG. 7, the workpieces produced are a triangular part 18 of the stack and a part 19 of the stack having a triangular recess. The pieces of the workpiece in the part 19 of the stack are connected together by four rivets in the areas of the corners, and those of the part 19 of the stack are connected by three rivets associated with corners. In both instances, the parts 18 and 19 are still connected to the base plate 2 which is only milled into but not completely milled through. It can be seen that there is a great advantage of the system in accordance with the invention when the lower workpiece is made as a workpiece carrier or base plate, this enables complete milling out of one part 18 from a stack of workpieces without there being any need for special measures to secure this part 18 or any cumbersome reclamping procedures. After machining, the parts produced by the remaining workpieces may be employed without further machining or deburring.

Figure 8:
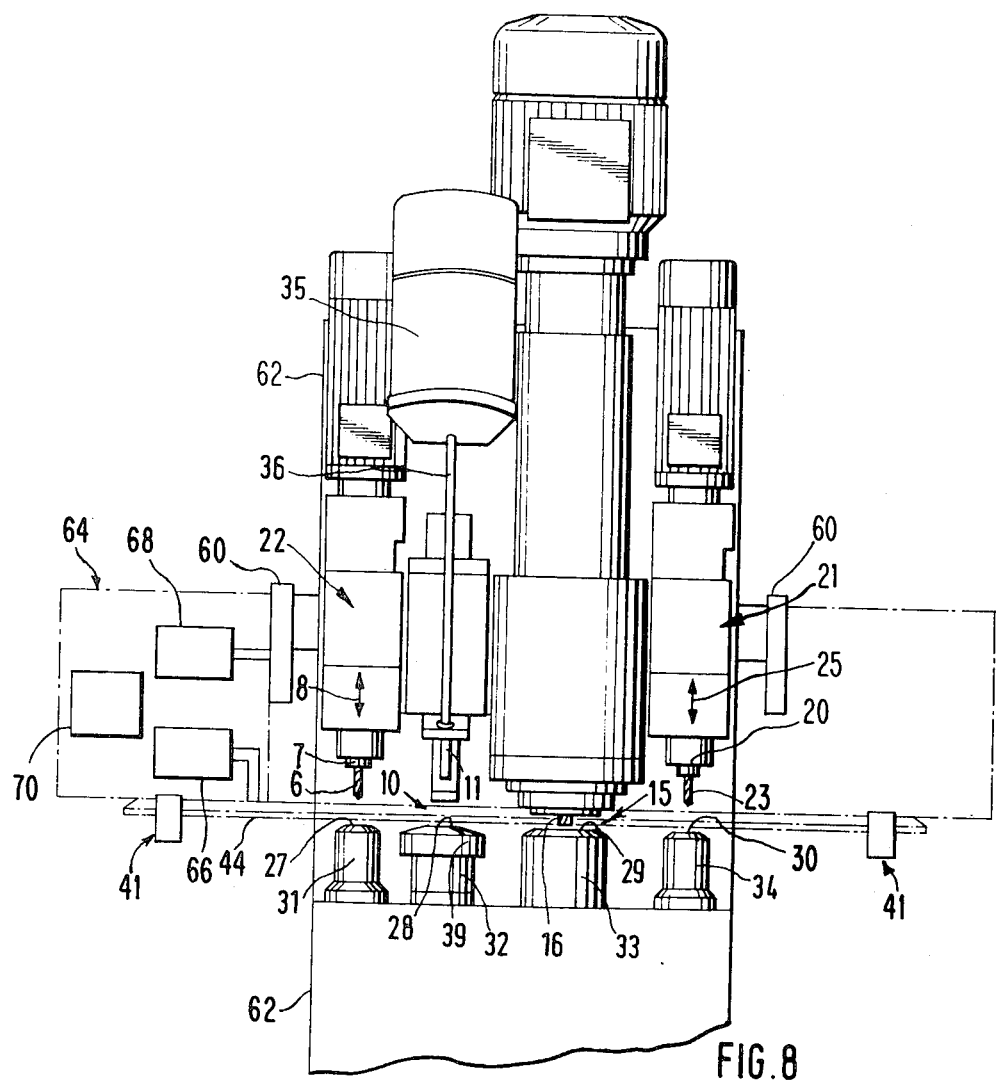
FIG. 8 is a side elevational view of the several work performing elements of a machine tool embodying the present invention; diagrammatically showing the transverse rail, main rail, support carriages, motors, and controlling means.

When the groove 17 has been produced or any other machining by this machine tool has been completed, the workpieces or the parts of the stack 3 held together by the rivets must be separated from each other and from the base plate 2. As seen in FIG. 6, this is effected by drilling out the rivets 9. For this purpose, a second feedable drilling spindle 20 is used as seen in FIG. 8. It belongs to the drilling mechanism 21 and can be moved upwardly and downwardly in the direction of the double arrow 25. Its drill, the diameter of which is preferably larger than the drill 6 of the drilling mechanism 22, is designated by numeral 23. FIG. 6 shows the drill hole 24 produced by it; in this embodiment, it is at the same time a necessary drilled hole in the now loose workpieces 1.

In the machining operation, FIG. 5 indicates that the end milling cutter 16, or any other machining tool, need penetrate into the base plate 2 only by the amount 26. For this reason, as already indicated, even when milling a groove closed on itself or a similar severing operation, the riveted stack is not divided into two parts and may be transported through the machine on its base plate 2.

The drilling mechanism 22, the riveting mechanism 10, and the machine tool 15 made as an end milling cutter, and the drilling mechanism 21 are arranged in the aforesaid sequence side-by-side and combined into one machine tool assembly. The geometrical axes of the machining tools, i.e., the drill 6, the rivet punch 11, the end milling cutter 16 and the drill 23, lie parallel to one another and they lie preferably in a common vertical plane. An advantageous form of this unit consists in providing a machining plane which is slightly inclined with respect to a horizontal plane so that the chips formed during the machining operation are flushed away by the cooling liquid flowing from about the cutting tool, and the workpieces are therefore not scratched by such metal chips in the course of further machining operations. In this case, the geometrical axes of the machining tools run perpendicularly to the plane of displacement of the workpieces, i.e., they are inclined at the same angle with respect to the vertical at which the plane of displacement of the workpieces is lying obliquely with respect to the horizontal. The plane of displacement of the workpieces is defined by the bearing faces 27, 28, 29 and 30 of the lower parts 31, 32, 33 and 34 of the mechanism, which thereby define a machine table which is substantially coincident with the rail 44 as seen in FIGS. 1 and 8. Alternatively, a separate work table or the like may be provided in the plane to support the stack in its movement therethrough. As seen in FIGS. 1 and 8, the stack 3 is held in the clamping devices 41 which in turn are movable in one axis on the rails 44 by the motor 66 and in the axis perpendicular thereto on the carriages 64 along the rails 60 by the motor 68. The control means 70 effects positioning of the stack 3 relative to the several stations by its control of the motors 66, 68.

Figure 9:
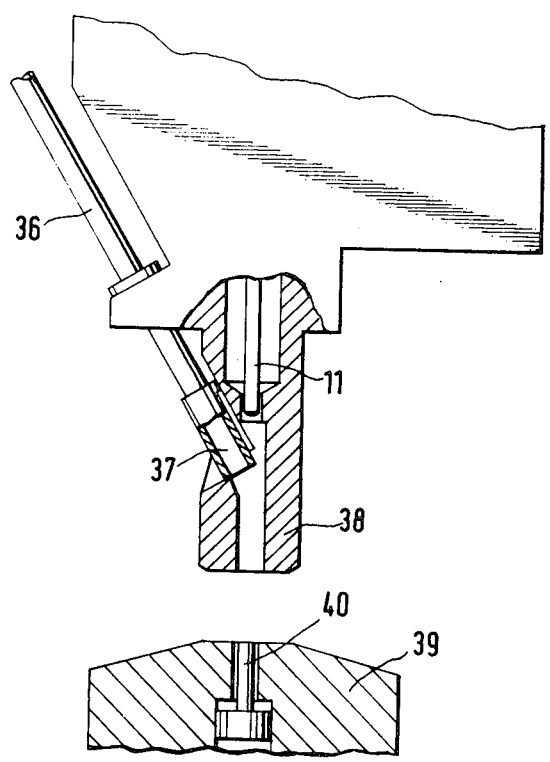
FIG. 9 is a fragmentary side elevational view of the riveting subassembly of the present invention with portions thereof broken away for clarity of illustration.

As seen in FIGS. 8 and 9, the riveting mechanism is equipped with a magazine 35, and a rivet feed 36 is connected to it. The outlet end 37 of the feed 36 terminates in a rivet feed piece 38 which lies between the riveting punch 11, shown in FIG. 9 in its withdrawn position, and the workpiece support or table 39. The latter is provided with a counter-pressure piston or mandrel 40 which can be fed upwardly towards the riveting punch 11, and which is coaxial with it.

Turning now to FIGS. 10 and 11, the rivet 109 is cylindrical and of a length substantially equal to the drilled aperture; there is a peripheral clearance in the undeformed state of FIG. 10 which is not conveniently illustrated. In this embodiment, the ends of the punch 111 and mandrel 112 are conical in configuration to produce the deformed rivet configuration shown in FIG. 11. This configuration and method of deformation have been found highly advantageous in maintaining good radial compression throughout the stack.

In the method of the present invention, those workpieces are particularly suitable which, in the finished state, must exhibit at least two drilled holes. The latter holes may, in fact, advantageously be used for the insertion of fasteners in subsequent assembly. However, the method may also find application any time that a workpiece must be provided with drilled holes and/or openings for the reduction of its weight. This is particularly true in the aircraft industry where saving of weight is desired and a large number of duplicate parts must be manufactured. Because of sensitivity to nicking, parts manufactured from light metal sheets are preferably not punched during forming operations; however, these parts often have a plurality of openings, slots, drill holes and the like which may be disposed close to the edges of the workpiece. If the workpieces are riveted together into a stack, machining is possible without reclamping because the stack may be secured in a way that the clamping means does not interfere with the machining. Moreover, inaccuracies in machining and other disadvantages can be avoided if the clamping means can be applied to points which are removed from the area to be machined. Moreover, the riveting of the stack into assembly prevents displacement of the sheets of the stack or the danger of relative shifting of the individual sheets of the stack in the case of forces applied by the machining tool.

The present invention lends itself to numerical control operations for both the initial clamping and subsequent machining operations including drilling, riveting, machining and drilling out of the rivets.

In the illustrated embodiment, the machine is a milling machine with end milling cutters, and the stack clamping means is displaced in the longitudinal and transverse directions by the motors 66, 68 through the control means 70. By alternate or simultaneous actuation of the longitudinal and cross feeds, the stack of workpieces can be displaced in any direction within the common plane so that in practice any inner or outer contour may be produced or machined. The feeding upwardly and downwardly of the milling cutter as well and the longitudinal and cross feeding of the stack of workpieces may, especially in the case of complicated configurations, be formed fully automatically by means of existing numerical control systems.

The clamping mechanism for the workpiece stack generally consists of at least two controllable claws arranged adjustably on a cross rail, the cross rail being displaceable along a rail longitudinal to the machine. A device of this kind, to be compared with a cross support, is frequently used in punch presses. The claws are made so that the stack of workpieces may be securely held down by them. The longitudinal and cross feeds are effected by separate individually controllable feed motors. The holding and clamping mechanisms may be directly or independently controlled or numerically controlled.

Preferably, the drilling mechanism providing the first and second drilling spindles, the riveting mechanism and the milling machine are combined into one machining unit with a common work table or common workpiece mounting member. In the case of automatic machining of the workpieces, the lateral pitch of the geometrical axes of the individual machining tools must be taken into consideration in the numerical control mechanism. In that case, it is of particularly advantage if the bearing surface of the work table or the like, or the plane of lateral displacement or movement of the stack, is slightly inclined with respect to the horizontal. The chips occuring in the case of the machining of the workpieces by cutting may be easily flushed away by the cooling liquid. This is particularly advantageous when a relatively large amount of chips will occur.

The use of a consumable base plate of greater thickness to act as a workpiece carrier is particularly advantageous. As indicated, the workpiece carrier enables favorable clamping of the stack, milling of closed grooves, or machining or otherwise forming an outer contour completely in a single clamping operation. The workpiece carrier may, if necessary, be employed a number of times. In the case of thin sheet metal workpieces, it is for many reasons advantageous if the workpiece carrier has a greater thickness than the remaining workpieces in the stack. One may then penetrate with the milling cutter into the workpiece carrier so deeply that in fact all of the remaining workpieces in the stack are divided into two parts by means of a closed groove, but the separate parts are connected by the undivided workpiece carrier.

By having the workpiece carrier project on at least one side beyond the remaining workpieces to form a clamping edge, significant advantages are obtained. This projection may be achieved by sidewise shifting of the base plate with respect to the remaining workpieces in the stack or by providing greater dimensions on the base plate in at least one direction. The edge of the stack associated with the clamping edge may be stopped against a part of the machine to provide a guide or limit, such as against the clamping device or the claws of the clamping device to rapidly and accurately align the stack of workpieces. Moreover, clamping on this clamping edge portion allows machining of the stack directly up to the area of the clamping device. The formation of the stack by riveting the workpieces together now permits any type of machining to be performed within the stack since the clamping takes place outwardly thereof.

The term "table" or "work table", as used herein, includes a continuous table or a series of separate elements defining a bed or support for the stack at the various work stations.

Having thus described the invention, we claim:

1. In a method for machining simultaneously a stack of workpieces, the steps comprising:
   A. assembling a stack of platelike workpieces onto a base plate of similar material to produce a workpiece assembly;
   B. applying means to temporarily secure said workpieces in said stack on said base plate;
   C. drilling at least two spaced apertures through said workpieces of said stack and in said base plate;
   D. inserting rivets into said drilled apertures and deforming said rivets within said apertures in said workpieces and said base plate to secure said workpieces on said base plate in fixed relationship within said workpiece assembly;
   E. removing said temporary securing means and engaging said workpiece assembly with automatic movement means;
   F. automatically moving said stack on a work supporting surface of a table to a machining station;
   G. automatically machining simultaneously said workpieces of said stack and at least a portion of the depth of said base plate by movement of said assembly relative to machining means at said station;
   H. automatically moving said assembly on said table to a drilling station;
   I. drilling out said rivets of said stack;
   J. disassembling said workpieces of said stack from said base plate.

2. The method of claim 1 wherein said workpieces are assembled in a stack upon a carrier member of different dimensions than said workpieces and providing said base plate.

3. The method of claim 2 wherein said carrier member and said workpieces are of similar composition.

4. The method of claim 2 wherein the workpiece stack is releasably supported upon said table and is automatically moved between drilling, riveting and machining means at spaced stations to perform said drilling, riveting and machining steps and wherein said stack is thereafter released from said table.

5. The method of claim 4 wherein said machining operation penetrates the workpiece adjacent said carrier member and into the surface of said carrier member, wherein said carrier member is of larger dimension than said workpieces so as to provide at least one portion projecting therebeyond, and wherein said projecting portion is releasably secured above said machine table.

6. The method of claim 2 wherein, during said riveting step, the rivet does not project beyond the upper surface of said stack and the ends of the rivet are deformed by cooperating punch and mandrel members having substantially conical opposing surfaces.

* * * * *